(12) United States Patent
Zheng et al.

(10) Patent No.: US 9,849,532 B2
(45) Date of Patent: Dec. 26, 2017

(54) COMPOSITE WEAR PAD AND METHODS OF MAKING THE SAME

(71) Applicants: Qingjun Zheng, Export, PA (US); Robert J. Vasinko, Latrobe, PA (US); Yixiong Liu, Greensburg, PA (US)

(72) Inventors: Qingjun Zheng, Export, PA (US); Robert J. Vasinko, Latrobe, PA (US); Yixiong Liu, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 356 days.

(21) Appl. No.: 14/303,205

(22) Filed: Jun. 12, 2014

(65) Prior Publication Data
US 2015/0360311 A1    Dec. 17, 2015

(51) Int. Cl.
| | |
|---|---|
| *B32B 15/01* | (2006.01) |
| *C22C 19/05* | (2006.01) |
| *B23K 1/19* | (2006.01) |
| *B23K 1/00* | (2006.01) |
| *B23K 35/02* | (2006.01) |
| *B23K 35/30* | (2006.01) |
| *B23K 35/32* | (2006.01) |

(Continued)

(52) U.S. Cl.
CPC .............. *B23K 1/0008* (2013.01); *B22F 7/08* (2013.01); *B23K 1/19* (2013.01); *B23K 35/0222* (2013.01); *B23K 35/0233* (2013.01); *B23K 35/0244* (2013.01); *B23K 35/0255* (2013.01); *B23K 35/30* (2013.01); *B23K 35/3033* (2013.01); *B23K 35/3046* (2013.01); *B23K 35/3053* (2013.01); *B23K 35/3066* (2013.01); *B23K 35/327* (2013.01); *B23K 35/36* (2013.01); *B32B 15/01* (2013.01); *B32B 15/013* (2013.01); *C22C 1/1036* (2013.01); *C22C 29/04* (2013.01); *C22C 29/14* (2013.01); *C22C 29/16* (2013.01); *C22C 32/0047* (2013.01); *C22C 33/0228* (2013.01); *C22C 33/0242* (2013.01); *C22C 33/0292* (2013.01); *B22F 2998/10* (2013.01); *B22F 2999/00* (2013.01); *Y10T 428/12104* (2015.01)

(58) Field of Classification Search
CPC ................................ B32B 15/01; C22C 19/05
USPC .................................................. 428/678–682
See application file for complete search history.

(56) References Cited

U.S. PATENT DOCUMENTS

| | | |
|---|---|---|
| 3,743,556 A | 7/1973 | Breton et al. |
| 3,779,715 A | 12/1973 | Wendler et al. |

(Continued)

FOREIGN PATENT DOCUMENTS

WO    WO2013037945    *    3/2013    ............. F04D 7/04

OTHER PUBLICATIONS

Ilegbusi, O. et al., Porosity Nucleation in Metal-Matrix Composites, Metallurgical and Materials Transactions A, vol. 31A, Aug. 2000, pp. 2069-2074.

*Primary Examiner* — Humera Sheikh
*Assistant Examiner* — Lucas Wang
(74) *Attorney, Agent, or Firm* — Matthew S. Bedsole

(57) ABSTRACT

A composite wear pad includes a substrate that is selected from the group of iron based alloys, steel, nickel based alloys, and cobalt based alloys. A hard particle-matrix alloy layer is bonded at a surface to the substrate. The hard particle-matrix alloy layer has a plurality of hard particles dispersed in a matrix alloy. The hard particle-matrix alloy layer has a thickness ranging between greater than about 13 millimeters and about 20 millimeters.

20 Claims, 11 Drawing Sheets

(51) Int. Cl.
*B23K 35/36* (2006.01)
*B22F 7/08* (2006.01)
*C22C 1/10* (2006.01)
*C22C 32/00* (2006.01)
*C22C 29/04* (2006.01)
*C22C 29/14* (2006.01)
*C22C 29/16* (2006.01)
*C22C 33/02* (2006.01)

(56) References Cited

U.S. PATENT DOCUMENTS

| | | |
|---|---|---|
| 3,864,124 A | 2/1975 | Breton et al. |
| 3,916,506 A | 11/1975 | Wolf |
| 4,017,480 A | 4/1977 | Baum |
| 4,194,040 A | 3/1980 | Breton et al. |
| 4,624,860 A | 11/1986 | Alber et al. |
| 4,685,359 A | 8/1987 | Worthen et al. |
| 5,164,247 A | 11/1992 | Solanki et al. |
| 5,236,116 A * | 8/1993 | Solanki ............... C23C 24/103 228/178 |
| 5,352,526 A | 10/1994 | Solanki et al. |
| 6,649,682 B1 | 11/2003 | Breton et al. |
| 7,984,866 B2 | 7/2011 | Cymerman et al. |
| 2005/0103909 A1 | 5/2005 | Lin et al. |
| 2011/0171484 A1* | 7/2011 | Konyashin ............ C23C 26/02 428/556 |
| 2011/0300016 A1* | 12/2011 | Heath ............... B22F 1/0003 420/12 |
| 2013/0266820 A1* | 10/2013 | Kusinski ............... C22C 38/04 428/682 |
| 2014/0369846 A1* | 12/2014 | Berglund ............... F01D 5/286 416/224 |

\* cited by examiner

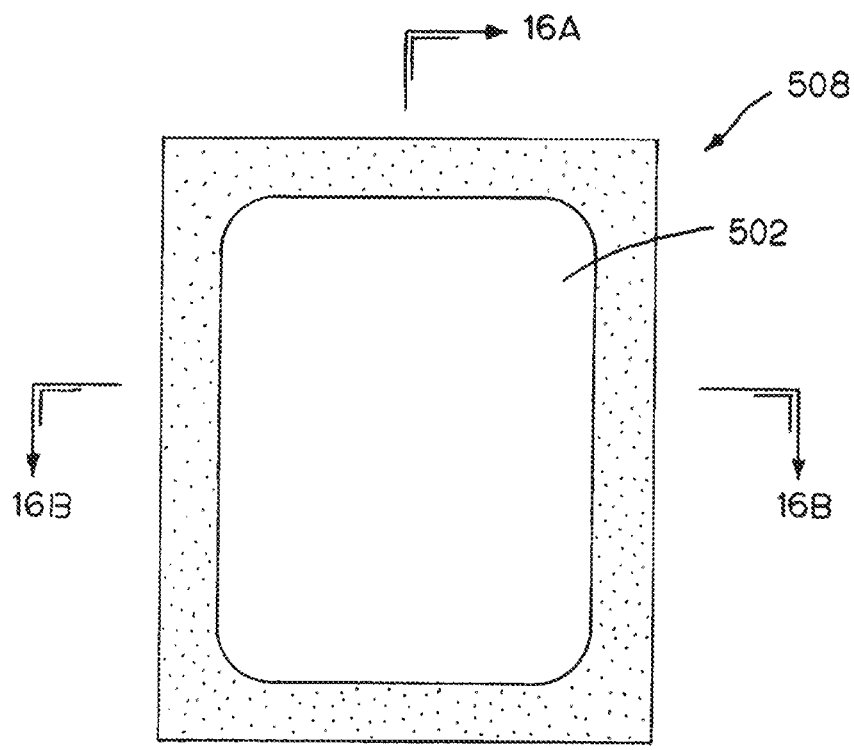
FIG. 16
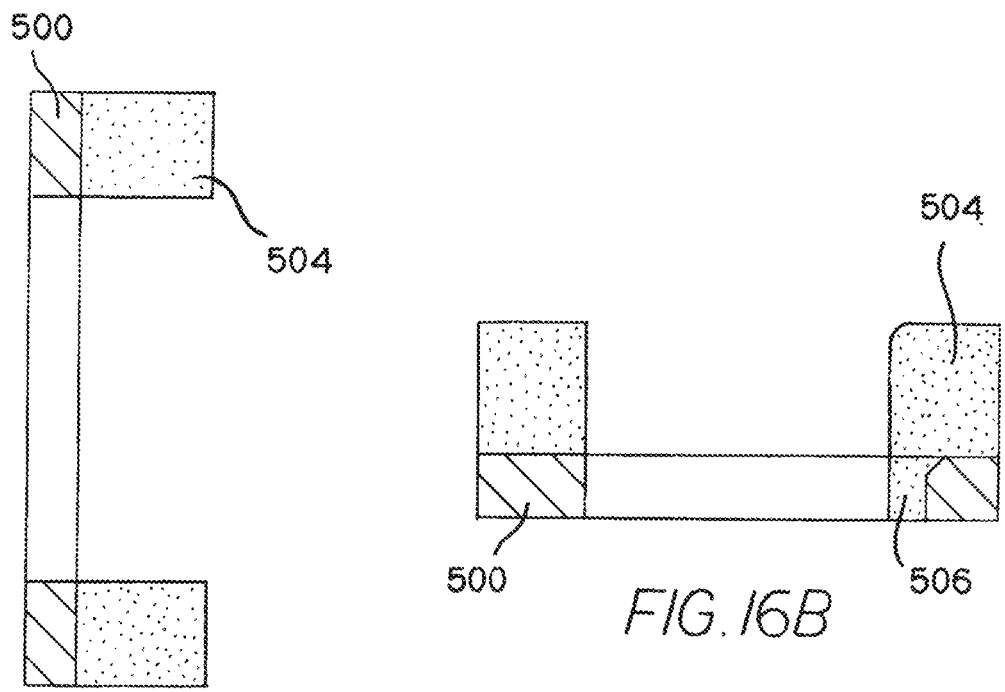
FIG. 16A
FIG. 16B

COMPOSITE WEAR PAD AND METHODS OF MAKING THE SAME

BACKGROUND

The present invention pertains to a composite wear pad (and methods of making the same) adapted for use in conjunction with articles used in severe operating environments wherein wear-resistance and the thickness of the wear resistant layer are important properties. More specifically, the present invention pertains to a composite wear pad (and methods of making the same) adapted for use in conjunction with articles used in such severe operating environments wherein the wear pad includes a wear-resistant hard particle-containing layer (a cladding layer) metallurgically bonded to a metal or alloy substrate wherein as an option, the substrate is weldable. Further, the hard particle-containing layer or cladding layer of the present invention has a thickness equal to or greater than 3 millimeters (mm). The thickness of the cladding layer of the invention can have a thickness that ranges between about 3 mm and about 20 mm. Still further in another range, the thickness of the cladding layer of the invention can have a thickness that ranges between about 5 mm and about 15 mm. Yet, further in another range, the thickness of the cladding layer of the invention can have a thickness that ranges between about 10 mm and about 20 mm.

Equipment that operates in severe operating environments has typically benefited through the use of components that exhibit improved wear-resistance. In such severe operating environments, wear-resistance and the thickness of the wear resistant layer are important properties to achieve acceptable operational life. In the absence of such properties like wear-resistance, and/or the thickness of the wear resistant layer, the equipment can experience reduced life, which is undesirable.

One way to improve the operational life of equipment is to apply a coating. In this regard, coatings are often applied to equipment subjected to harsh environments or operating conditions in efforts to extend the useful lifetime of the equipment. Various coating identities and constructions are available and typically are selected based upon the mode of failure to be inhibited. For example, wear resistant coatings of ceramics (e.g. alumina, titanium nitride, titanium carbide etc), metal matrix composites (e.g. tungsten carbide-metal matrix coating), wear resistant alloys (e.g. Stellite alloys, triboloys), diamond, or diamond-like carbon have been developed for metallic substrates wherein the coating is deposited on the substrate by physical vapor deposition, chemical vapor deposition, thermal spray, electroplating or electroless plating. While such coatings provide benefits, one issue with these coating applications is the limitation of the coating thickness. Typically the thickness of the above coatings is from several microns to hundreds of microns, which limits the operational life of the equipment with more allowable wear.

A further way to extend the operational life of equipment with more allowable wear is to apply thicker claddings to the articles or components subjected to harsh environments or operating conditions. Various cladding identities and constructions are available, and typically are selected based on the mode of failure to be inhibited. For example, wear resistant chromium carbide-metal, tungsten carbide-metal stellite alloy, and tribaloy alloy claddings with different welding techniques like tungsten inert gas welding, metal inert gas welding, plasma transferred arc, and laser cladding have been developed for metal and alloy substrates. These claddings can be used in a composite wear pad comprising the cladding and a metal or metal alloy substrate, but as described hereinafter, these claddings have drawbacks.

One way to extend increased operational life of equipment of large allowable wear is the use of a chromium carbide weld overlay wear pad. However, there are some drawbacks to this kind of wear pad. Chromium carbide in a steel-based or nickel-based alloy matrix has a lower abrasion resistance, in comparison with tungsten carbide-metal based cladding so that it may be unsuitable for some severe environment applications. In order to achieve a sufficient thickness, multiple welding passes are necessary, which increase manufacturing costs. The intense heat in a welding process can cause dilution of the backing steel substrate and degradation of the weld overlay layer, which are undesirable. Weld overlays are typically not uniform in composition and microstructure, and may contain defects such as segregation and voids. The as-deposited surface of a weld is rough and requires additional machining to achieve a sufficient surface smoothness.

Another way to provide a composite wear pad to extend the operational life of equipment of large allowable wear is tungsten carbide-metal cladding by PTA (Plasma Transfer Arc) or laser cladding or other welding processes like tungsten inert gas welding and metal inert gas welding. Drawbacks with these methods are similar to the drawbacks connected with the chromium carbide weld overlay. These drawbacks include the need to use multiple passes to achieve the necessary thickness. The intensive heat connected with the welding process may also result in damaging the substrate including dilution of the steel substrate at different level dependent on the welding technology and dissolving of steel substrate into the wear pad causing a reduction in the wear resistance. Using multiple passes to achieve a required thickness typically causes defects such as nonuniformity in composition and microstructure, e.g. segregation and voids between the joints of welding passes. The as-deposited surface of a weld is rough and often requires additional machining to achieve a sufficient surface smoothness.

Another way to extend the operational life of the equipment includes the use of a cemented tungsten carbide wear plate with or without a backing member. It has the advantage of being very wear resistant. However, the use of such a structure, i.e., a cemented tungsten carbide wear plate with or without a backing member, displays a number of drawbacks. These drawbacks include the size limitation to the lateral dimension of the carbide pads, which increase the labor cost for applying the carbide pads to the equipment. The brittleness of carbide causes easy chipping, cracking and even fracture of the wear plate. The cemented tungsten carbide wear plate with or without a backing member is not weldable, and therefore, does not have as wide application as if it were weldable. The cemented tungsten carbide wear plate is typically attached to the equipment by brazing, adhesive or mechanical locking, and size of the cemented tungsten carbide wear plate is restricted by the method of attachment. If brazing is used, the size of the cemented tungsten carbide wear plate is limited to a size of, for example, two inches by two inches. The brazed joint also represents a weak point for the article, for when exposed to excessive wear, can be washed and cause pop-off of the wear pads or other modes of premature failure. If the attachment is by adhesive, the application temperature for the article or equipment is also limited, typically below about 200° C. dependent on the adhesive being used. The cemented tungsten carbide wear plate attached to the equipment by adhesive typically has even lower bonding strength than brazing and thus has the tendency to pop off of the backing substrate which could cause a catastrophic failure of the article or equipment. The inherent weakness of adhesive can limit the effective use of a tungsten carbide wear plate.

Yet another way to provide the increased life of an equipment subject to wear is to use a high chromium cast iron material. Drawbacks connected with this material include the fact that it is not weldable, difficult to braze or machine. Further, it has a low wear resistance in comparison to hard composite coatings or claddings.

The following exemplary patent documents disclose various ways that persons have tried to improve wear-resistance.

In reference to the use of flexible cloth, U.S. Pat. No. 3,743,556 to Breton et al. discloses the use of one flexible cloth containing metal matrix alloy particles and another flexible cloth containing hard particles wherein the cloths are positioned one on top of the other on the surface of a substrate to form a laminate. The laminate is heated under various conditions (e.g., at a temperature equal to 1040-1080° C. in a hydrogen purge) to form a hard layer on the surface of the substrate wherein the thickness of the hard layer in several examples appears to be "slightly greater" than 30 mils or 60 mils or 0.090 inches. U.S. Pat. No. 3,864,124 to Breton et al. and U.S. Pat. No. 4,194,040 to Breton et al. each discloses using flexible sheets to form products wherein the thickness of the hard layer is on the order of 0.030 inches or less. U.S. Pat. No. 3,916,506 to Wolf appears to also use flexible sheets to form a hard layer wherein the thickness thereof appears to be between 0.005 inches to 0.06 inches. One process parameter comprises heating in a hydrogen atmosphere at a temperature of 975-1150° C. to decompose the PTFE binder and to flow the Ni-based alloy. U.S. Pat. No. 4,624,860 to Alber et al. discloses the use of flexible sheet to achieve a hard layer of 0.060 inches. One exemplary process comprises heating under vacuum at 1120° C. for 20 minutes. U.S. Pat. No. 5,164,247 to Solanski et al. discloses the use of flexible cloth to achieve a layer with a thickness of 0.060 inches. One exemplary process comprises heating at 1140° C. for 30 minutes. Other patents that disclose the use of flexible cloth include U.S. Pat. No. 4,685,359 to Worthen et al., U.S. Pat. No. 5,236,116 to Solanski et al. and U.S. Pat. No. 5,352,526 to Solanski et al.

In reference to the use of a paint or paste, U.S. Pat. No. 3,779,715 to Wendler et al. discloses a two-step process to make a hard member. The first step comprises applying a paste of braze and hard particles to the surface of a mold and heating (at 1020° C. for 15 minutes) the same to form a skeleton comprising hard particles brazed together with a brazing alloy. The second step comprises infiltrating (in a dry hydrogen furnace at 982° C. for about 15 minutes) braze material into the skeleton to form the end product. The examples show thicknesses of 5 mm to 6.5 mm, and Example 6 appears to have a thickness equal to 13 mm. U.S. Pat. No. 6,649,682 to Breton et al. appears to use a paint system to achieve a hard layer with a thickness of greater than 6 mm. One exemplary heating process comprises heating at 350 Celsius per hour to 980° C. and holding for one hour, and then increasing the temperature at a rate of 180 Celsius per hour to 1120° C. and holding for 30 minutes.

In reference to infiltration, U.S. Pat. No. 4,017,480 Baum discloses infiltration of hard particles with an alloy. The infiltration is carried out in a hydrogen furnace at the brazing temperature of the alloy (e.g., 1150-1190° C. or 1065-1200° C. or 1100-1150° C.) for about 20 minutes.

Although the above coatings and claddings have been able to improve or prolong operating life of the articles or equipment used in such severe operating environments, there remains the need to provide an improved cladding that displays improved wear-resistance. There remains the need to provide an improved composite wear pad with thicker wear resistant cladding layer adapted for use in conjunction with articles used in such severe operating environments wherein the wear pad includes a wear-resistant hard particle-containing layer (a cladding layer) secured (e.g., metallurgically bonded) to a metal or metal alloy substrate wherein the composite wear pad displays improved wear-resistance.

SUMMARY

In one form, the invention is a composite wear pad that comprises a substrate wherein the substrate is selected from the group consisting of iron based alloys, steel, nickel based alloys, and cobalt based alloys. The wear pad has a hard particle-matrix alloy layer bonded metallurgically at a surface to the substrate, and wherein the hard particle-matrix alloy layer comprises a plurality of hard particles dispersed uniformly in a matrix alloy, the substrate has little or less dilution than wear pads made by metal inert gas, tungsten inert gas, PTA or laser cladding weld overlay process and the hard particle-matrix alloy layer has a thickness ranging between about 10 millimeters and about 20 millimeters.

In yet another form, the invention is a method of making a composite wear pad comprising the steps of: providing a substrate wherein the substrate being selected from the group consisting of iron based alloys, steel, nickel based alloys, and cobalt based alloys, and the substrate having a surface; disposing over the surface of the substrate a flexible hard particle sheet wherein the flexible hard particle sheet comprising a plurality of hard particle entrained in a first flexible polymeric matrix; disposing a flexible matrix alloy sheet over the flexible hard particle sheet, and the flexible matrix alloy sheet comprising matrix alloy particles entrained in a second flexible polymeric matrix; and heating the flexible hard particle sheet and the flexible matrix alloy sheet whereby the matrix alloy melts and infiltrates the hard particles forming a hard particle-matrix alloy layer metallurgically bonded to the substrate, and wherein the hard particle-matrix alloy layer having a thickness equal to or greater than about 3 millimeters.

In another form thereof, the invention is a method of making a composite wear pad comprising the steps of: providing a substrate wherein the substrate being selected from the group consisting of iron based alloys, steel, nickel based alloys, and cobalt based alloys, and the substrate having a top surface; disposing over a surface of the substrate a hard particle perform wherein the hard particle preform comprising a plurality of hard particles; disposing a matrix alloy perform on the hard particle preform, and the matrix alloy preform comprising matrix alloy; and heating the matrix alloy preform whereby the matrix alloy melts and infiltrates the hard particles forming a hard particle-matrix alloy layer metallurgically bonded to the substrate, and wherein the hard particle-matrix alloy layer having a thickness equal to or greater than about 3 millimeters.

In still another form thereof, the invention encloses a method of making a composite wear pad comprising the steps of: providing a substrate wherein the substrate being selected from the group consisting of iron based alloys, steel, nickel based alloys, and cobalt based alloys, and the substrate having a top surface; disposing over the top surface of the substrate a volume of hard particles wherein the hard particles are in a first liquid carrier; disposing over the volume of hard particles a volume of matrix alloy particles wherein the matrix alloy particles are in a second liquid carrier; and heating the volume of hard particles and the volume of matrix alloy particles wherein the matrix alloy melts and infiltrates the hard particles forming a hard particle-matrix alloy layer metallurgically bonded to the substrate, and wherein the hard particle-matrix alloy layer having a thickness equal to or greater than about 3 millimeters.

BRIEF DESCRIPTION OF THE DRAWINGS

The following is a brief written description of the drawings that form a part of this patent application:

FIG. 16 is a top view of molybdenum-nickel-chromium steel plate with an inscribed square in the center of the plate wherein the plate is coated with a cladding;

FIG. 16A is a cross-sectional view of the plate of FIG. 16 taken along section line 16A-16A of FIG. 16; and FIG. 16B is a cross-sectional view of the plate of FIG. 16 taken along section line 16B-16B of FIG. 16.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations may be readily apparent to those of skill in the art without departing from the spirit and scope of the invention.

In a broader aspect, the specific embodiment comprises a composite wear pad adapted for use in conjunction with articles used in such severe operating environments wherein the wear pad includes a wear-resistant—hard particle-containing layer (a cladding layer) metallurgically bonded to a metal or metal alloy substrate, which optionally can be weldable. The composite wear pad comprises a wear-resistant—hard particle-containing layer (a cladding layer) secured such as, for example, by metallurgically bonding to a metal or metal alloy substrate.

The composite wear pad can take on any one of a number of shapes and sizes wherein such shape, size and thickness is not inconsistent with the objectives of the present invention. The selection of the shape and size of the composite wear pad is dependent on specific application such as the article or equipment to which the composite wear pad is affixed. In general, the composite wear pad can be square and/or rectangular with the width and the length varying between about 20 millimeters (mm) and about 1000 mm. One such example is a strip for a sieving kit that has a width dimension of about 10 mm to about 40 mm (width) and a length dimension between about 300 mm and about 800 mm. Another such example is a wear pad, which exhibits a width of about 30 mm and a length about 300 mm, useful for oil sand sifting screen. The above wear pads may have a total thickness (the sum of the thickness of the hard particle (or cladding) layer and the substrate) that ranges between about 10 mm and about 30 mm wherein the thickness of the hard particle layer (or cladding layer) is at least equal to or greater than about 3 mm. The thickness of the cladding layer can range between about 3 mm and about 20 mm. In an alternative, the thickness of the cladding layer can range between about 5 mm and about 15 mm. In still another alternative, the thickness of the cladding layer can range between about 10 mm and about 20 mm.

Figure 4:
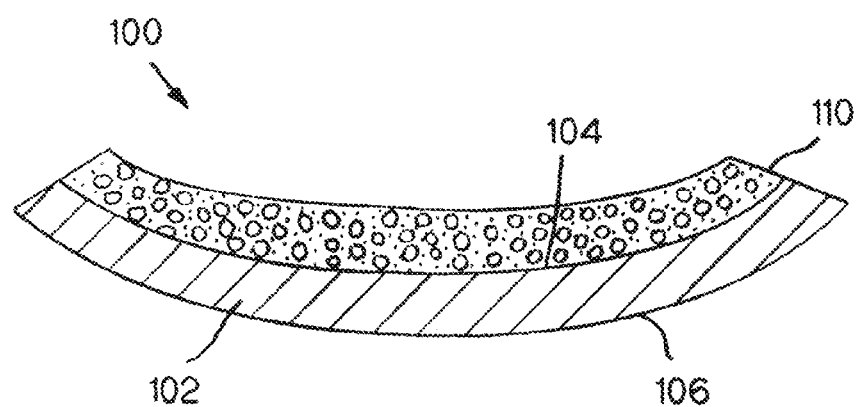
FIG. 4 is schematic view of a composite wear pad with a substrate and a hard particle-matrix alloy layer that comprises hard particles and a metal or alloy matrix and wherein the surface is curved or arcuate convex

Still referring to the shape of the composite wear pad, it can also be curved or have curvature in one side or both sides dependent on curvature of the location of wear to attach to. For example, for attaching to inner diameter of a tube, the wear pads may have the curvature of the inner diameter of the tube. In this regard, FIG. 4 shows a composite wear pad in which the substrate has a curved or arcuate convex surface.

In reference to the hard particle-matrix alloy layer or cladding, the hard particle-matrix alloy layer (or cladding) that is a part of the composite wear pad functions as an abrasion resistant and/or erosion resistant layer. The hard particle-matrix alloy layer comprises hard particles disposed in a metal or alloy matrix. These hard particles of the hard particle layer, at least in some embodiments, comprise metal carbides, metal nitrides, metal carbonitrides, metal borides, metal silicides, cemented carbides, cast carbides, other metal matrix composites, ceramic matrix composites, ceramics or mixtures thereof. In some embodiments, metallic elements of hard particles comprise one or more metallic elements selected from the group consisting of metallic elements of Groups IIIA (aluminum, boron), IVB, VB, and VIB of the Periodic Table. Groups of the Periodic Table described herein are identified according to the CAS designation.

Even more specifically, the hard particles in some specific embodiments comprise tungsten carbide, boron nitride or titanium nitride or mixtures thereof. In some embodiments, hard particles comprise carbides of tungsten, titanium, chromium, molybdenum, zirconium, hafnium, tantalum, niobium, rhenium, vanadium, iron, boron or silicon or mixtures thereof. Hard particles, in some embodiments, comprise nitrides of aluminum, boron, silicon, titanium, zirconium, hafnium, tantalum or niobium or mixtures thereof. Additionally, in some embodiments, hard particles comprise borides such as titanium di-boride and tantalum borides or silicides such as $MoSi_2$. Hard particles, in some embodiments, comprise crushed cemented carbide, crushed binderless carbide, crushed cermet, crushed nitride, crushed boride or crushed silicide or combinations thereof. In some embodiments, hard particles comprise intermetallic compounds such as nickel aluminide.

In regard to the content of hard particles, the hard particles can be present in the metal or alloy matrix of the hard particle-matrix alloy layer in any amount not inconsistent with the objectives of the present invention. Hard particle loading of the hard particle-matrix alloy layer can be varied according to several considerations including, but not limited to, the desired hardness, abrasion resistance and/or toughness of the hard particle-matrix alloy layer, as well as those factors that influence wear resistance properties. In some embodiments, hard particles are present in the metal or alloy matrix in an amount ranging from about 30 volume percent to about 80 volume percent of the volume of the hard particle-matrix alloy layer. In some embodiments, the hard particles are present in the hard particle layer in an amount ranging from about 40 volume percent to about 70 volume percent of the hard particle-matrix alloy layer. In yet some other embodiments, the hard particles are present in the hard particle layer in an amount ranging from about 50 volume percent to about 70 volume percent of the hard particle-matrix alloy layer.

In reference to the size of the hard particles, the hard particles of the hard particle-matrix alloy layer can have any size not inconsistent with the objectives of the present invention. The particle size distribution of the hard particles can vary between 0.1 microns to 10 mm in some embodiments. In some other embodiments, the hard particles have a size distribution ranging from about 1 microns to about 1 mm. In yet other embodiments, the hard particles have a size less than 45 microns. In still other embodiments, the hard particles may have a size from 3-7 mm. Hard particles, in some other embodiments, demonstrate bimodal or multi-modal size distributions. The hard particles of the hard particle layer can exhibit any desired shape or geometry. In some embodiments, hard particles have spherical or elliptical geometry. In some embodiments, hard particles have a polygonal geometry. In some embodiments, hard particles have irregular shapes, including shapes with sharp edges.

In reference to the metal or alloy matrix of the hard particle-matrix alloy layer (or cladding), the metal or alloy matrix of the hard particle-matrix alloy layer can be selected according to various considerations including, but not limited to, the compositional identity of the substrate and/or the compositional identity of the particles to be disposed in the metal or alloy matrix of the hard particle-matrix alloy layer. The metal or alloy matrix in the hard particle-matrix alloy layer exhibits hardness less than the hardness of the hard particles of the hard particle-matrix alloy layer. Any metal or alloy not inconsistent with the objectives of the present invention can be used as the matrix of the hard particle-matrix alloy layer. In some embodiments, for example, the alloy matrix of the coating comprises nickel-based alloys having compositional parameters derived from Table 1 below:

TABLE 1

Cladding Ni-Based Alloy Matrix Compositional Parameters (weight percent)

| Element | Amount (weight %) |
|---|---|
| Chromium | 3-28 |
| Boron | 0-6 |
| Silicon | 0-15 |
| Phosphorous | 0-12 |
| Iron | 0-6 |
| Carbon | 0-1 |
| Copper | 0-50 |
| Molybdenum | 0-5 |
| Niobium | 0-5 |
| Tantalum | 0-5 |
| Tungsten | 0-20 |
| Nickel | Balance |

In some embodiments, the nickel alloy matrix of the hard particle-matrix alloy layer of the composite wear pads is selected from the nickel-based alloys identified in Table 2 below. Nickel is the balance in the compositions of Table 2.

TABLE 2

Cladding Ni-Based Alloy Matrix Compositional Parameters (weight percent)

| Ni-Based Alloy | Compositional Parameters (weight %) |
|---|---|
| 1 | Ni-(13-17) % Cr-(2.5-5) % B-0.06% C |
| 2 | Ni-(12-16) % Cr-(3-6) % Si-(3-6) % Fe-(2-4) % B-C |
| 3 | Ni-(3-6) % Si-(2.0-4.5) % B-C |
| 4 | Ni-(12-16) % Cr-(8-12) % P-C |
| 5 | Ni-(23-27) % Cr-(8-12) % P |
| 6 | Ni-(17-21) % Cr-(9-11)Si-C |
| 7 | Ni-(20-24) % Cr-(5-8) % Si-( 3-6) % P |
| 8 | Ni-(13-17) % Cr-(6-10) % Si |
| 9 | Ni-(15-19) % Cr-(7-11) % Si-B |
| 10 | Ni-(5-9) % Cr-(4-6) % P-(45-55) % Cu |
| 11 | Ni-(4-6) % Cr-(60-70) % Cu-(3-5) % P |
| 12 | Ni-(13-15) % Cr-(2.75-3.5) % B-(4.5-5.0) % Si-(4.5-5.0) % Fe-(0.6-0.9) % C |
| 13 | Ni-(18.6-19.5) % Cr-(9.7-10.5) % Si |

The alloy matrix of the hard particle-matrix alloy layer of the composite wear pads, in some embodiments, comprises copper-based alloys. Suitable copper-based alloys can comprise additive elements of nickel (0-50 weight %), manganese (0-30 weight %), zinc (0-45 weight %), aluminum (0-10 weight %), silicon (0-5 weight %), iron (0-5 weight %) and the balance copper, as well as other elements including phosphorous, chromium, beryllium, titanium and/or lead. In some embodiments, the alloy matrix of the cladding is selected from the Cu-based alloys identified in Table 3 below.

TABLE 3

Cladding Cu-Based Alloy Matrix Compositional Parameters (weight percent)

| Cu-Based Alloy | Compositional Parameters (weight %) |
|---|---|
| 1 | Cu-(19-26) % Ni-(19-26) % Mn |
| 2 | Cu-(8-12) % Ni |
| 3 | Cu-(5-9) % Ni-(10-16) % Mn |
| 4 | Cu-(29-32) % Ni-(1.7-2.3) % Fe-(1.5-2.5) % Mn |
| 5 | Cu-(2.8-4.0) % Si-1.5% Mn-1.0% Zn-1.0% Sn-Fe-Pb |
| 6 | Cu-(7.0-8.5)Al-(11-14) % Mn-2-4) % Fe-(1.5-3.0) % Ni |

The alloy matrix of the cladding, in some embodiments, comprises cobalt-based alloys. Suitable cobalt-based alloys can comprise additive elements of chromium, nickel, boron, silicon, tungsten, carbon, phosphorous, titanium, niobium, tantalum, molybdenum, as well as other elements. In some embodiments, cobalt alloys are commercially available under the trade designation STELLITE®, Tribaloy® and/or MEGALLIUM®.

Matrix alloy of the cladding (or hard particle-matrix alloy layer) can also be iron-based alloy. In some embodiments, matrix alloy is an iron-based alloy selected from the iron-based alloys identified in Table 4 below. Iron is the balance in the compositions of Table 4.

TABLE 4

Cladding Fe-Based Matrix Alloy Compositional Parameters (weight percent)

| Fe-Based Alloy | Compositional Parameters (weight %) |
|---|---|
| 1 | Fe-(2-6) % C |
| 2 | Fe-(2-6) % C-(0-5) % Cr-(28-37) % Mn |
| 3 | Fe-(2-6) % C-(0.1-5) % Cr |
| 4 | Fe-(2-6) % C-(0-37) % Mn-(8-16) % Mo |

Referring to the nature of the substrate, the substrate, for example, can comprise iron based alloys, steel, nickel based alloys, cobalt based alloys or any other alloy which is not inconsistent with the objectives of the invention. In some embodiments, substrates comprise cast iron, low-carbon steels, alloy steels, tool steels or stainless steels. In some embodiments, a substrate comprises a refractory metal composition like tungsten, chromium, niobium, and/or tantalum. The substrate may also comprise titanium, aluminum and/or vanadium.

In reference to the properties of the hard particle-matrix alloy layer of the composite wear pad, the hard particle-matrix alloy layer of the composite wear pads described herein has an abrasion and erosion resistance greater than the substrate. Abrasion resistance recited herein is determined based on adjusted volume loss measured in accordance with Procedure A of ASTM G65 Standard Test Method for Measuring Abrasion Using the Dry Sand/Rubber Wheel. In some embodiments, the coating has an adjusted volume loss less than about 0.02 cm$^3$. The hard particle-matrix alloy layer, in some embodiments, has an adjusted volume loss less than about 0.01 cm$^3$ or less than about 0.008 cm$^3$. The hard particle-matrix alloy layer of the composite wear pads described herein, in some embodiments, demonstrates an erosion rate of less than about 0.05 mm$^3$/g at a particle impingement angle of 90 degrees according to ASTM G76-07—Standard Test Method for Conducting Erosion Tests by Solid Particle Impingement Using Gas Jets. The hard particle-matrix alloy layer, in some embodiments, displays an erosion rate less than about 0.03 mm$^3$/g at a particle impingement angle of 90 degrees according to ASTM G76-07. Further, a metal matrix composite layer, in some embodiments, displays an erosion rate less than about 0.02 mm$^3$/g at a particle impingement angle of 90 degrees according to ASTM G76-07.

Figure 1:
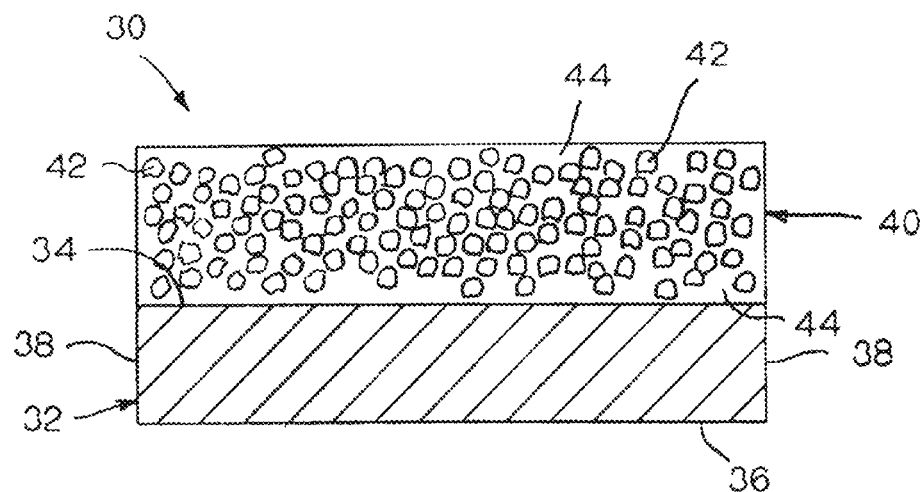
FIG. 1 is schematic view of a rectangular composite wear pad with a weldable substrate and a hard particle layer that comprises hard particles and a metal or alloy matrix.

Referring to the drawings, FIG. 1 is schematic view of a generally rectangular-shaped composite wear pad generally designated as 30. As mentioned earlier, the composite wear pad can take on any one of a number of shapes and sizes wherein such shape, size and thickness is not inconsistent with the objectives of the present invention. The selection of the shape and size of the composite wear pad is dependent on specific application such as the article or equipment to which the composite wear pad is affixed. Therefore, the specific geometry of this specific embodiment, as well as the other specific embodiments, should not be considered limiting to the scope of the invention.

Composite wear pad 30 comprises a substrate 32, which may or may not be weldable. Although not shown, the substrate can contain drilled and tapped holes, chamfers, channels, post or threaded posts to aid in the fastening of the wear plate to the machine equipment or other set-up. Substrate 32 has a top surface 34, a bottom surface 36 and edge surfaces 38. A hard particle-matrix alloy layer 40 is on the top surface 34 of the substrate 30. The hard particle-matrix alloy 40 comprises hard particles 42 dispersed throughout a matrix alloy region 44. The thickness of the hard particle-matrix alloy layer 40 is at least equal to about 3 mm, and in one range, is between about 3 mm and about 20 mm. In another range, the thickness of hard particle-matrix alloy layer 40 is between about 5 mm and about 15 mm. In another range, the thickness of hard particle-matrix alloy layer 40 is between about 10 mm and about 20 mm. The thickness of the composite wear pad 30 is between 10 mm and 15 mm.

Figure 2:
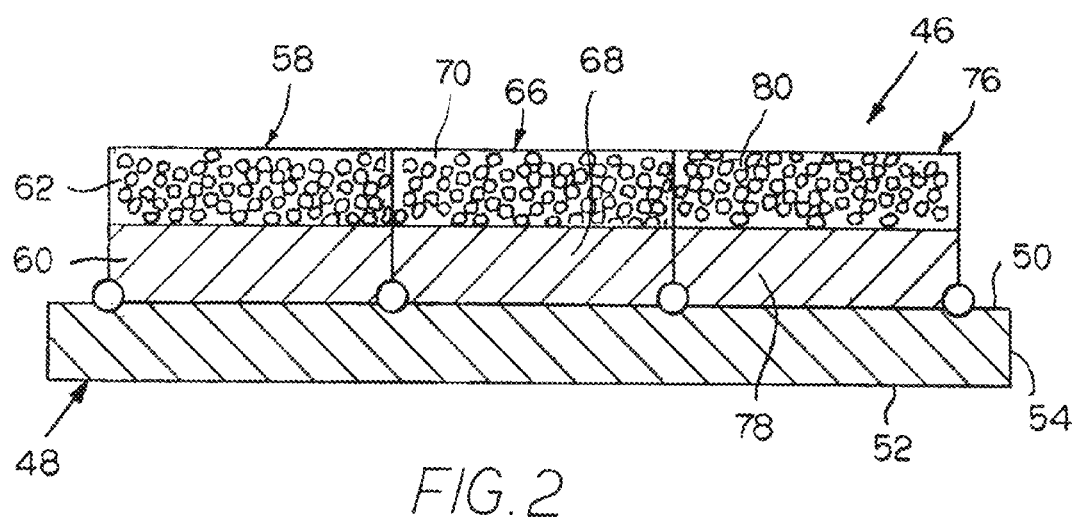
FIG. 2 is a schematic view of an array of composite wear pads welded to a base plate to create a wear resistant layer and wherein each composite wear pad comprises a hard particle-matrix alloy layer and a substrate.

FIG. 2 is a schematic view of an array of composite wear pads welded to a base plate to create a wear resistant layer. The specific embodiment of the array of composite wear pads is generally designated as 46 and includes a base plate 48. Base plate 48 has a top surface 50, a bottom surface 52, and edges surfaces 54. The first composite wear pad 58 has a substrate 60 with a hard particle-matrix alloy layer 62 thereon. The first composite wear pad 58 is welded to the top surface 50 of the base plate 48. The second composite wear pad 66 has a substrate 68 with a hard particle-matrix alloy layer 70 thereon. The second composite wear pad 66 is welded to the top surface 50 of the base plate 48 and bonded metallurgically to the first wear pad in substrate. The third composite wear pad 76 has a substrate 78 with a hard particle-matrix alloy layer 80 thereon. The third composite wear pad 76 is welded to the top surface 50 of the base plate 48 and bonded metallurgically to the second wear pad in substrate.

Figure 3:
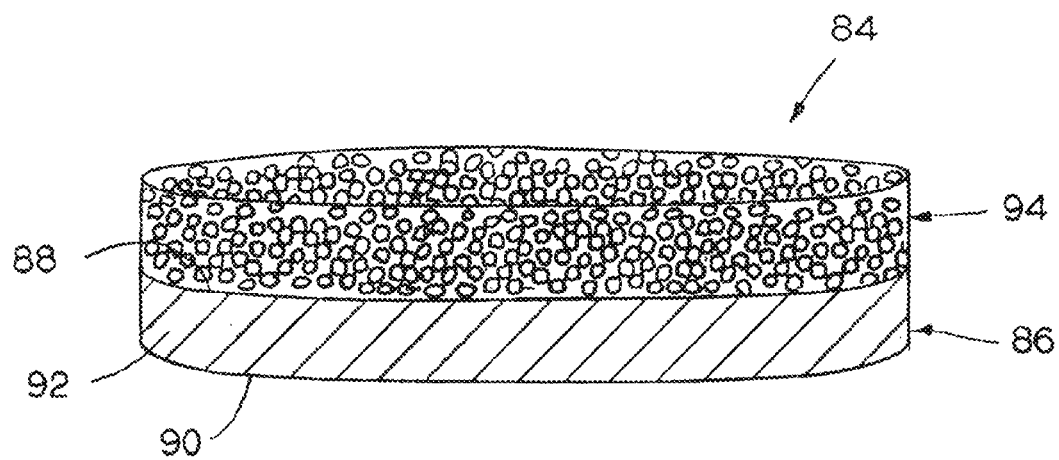
FIG. 3 is a schematic view of a circular composite wear pad with a generally circular substrate and a generally circular hard particle-matrix alloy layer that comprises hard particles and a metal or alloy matrix.

FIG. 3 is a schematic view of a circular composite wear pad 84 that comprises a generally circular substrate 86 that has a top surface 88, a bottom surface 90 and a circumferential edge 92. A hard particle-matrix alloy layer 94 is on the top surface 88 of the substrate 86.

FIG. 4 is schematic view of a composite wear pad 100 with a substrate 102 and a hard particle-matrix alloy layer 110. The substrate 102 has a top surface 104 and a bottom surface 106 both of which have an arcuate convex or curved geometry. The hard particle-matrix alloy layer 110 is on the top surface 104 of the substrate 102. Composite wear pad 100 is suitable for attachment to an arcuate surface such as, for example, the inside surface of a tube.

Figure 5:
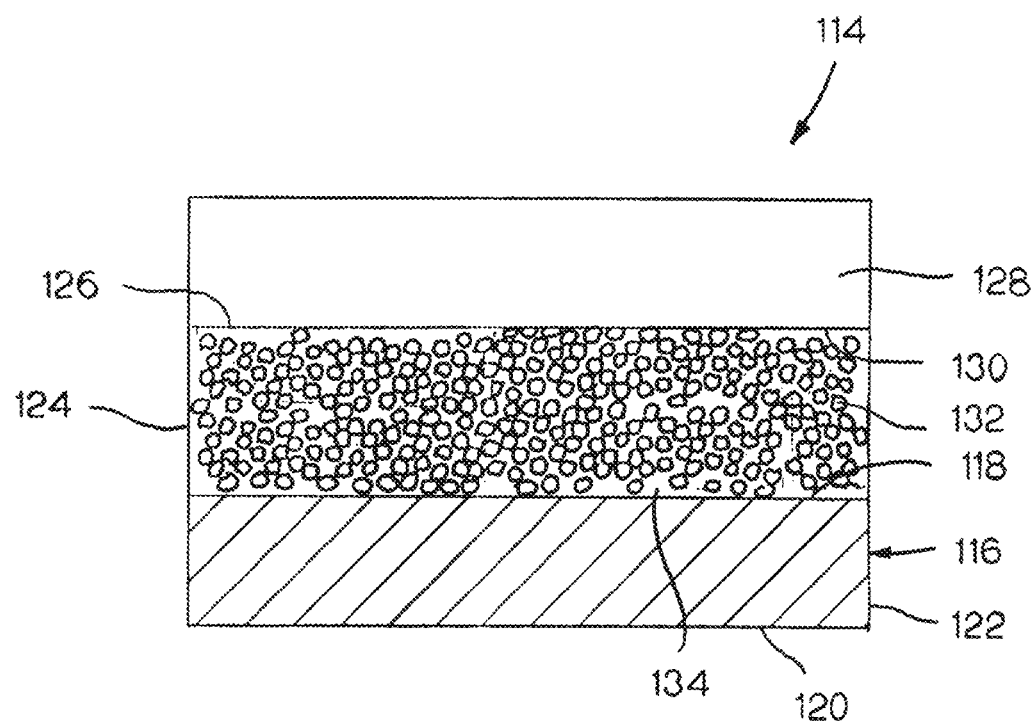
FIG. 5 is a schematic view of an arrangement to produce the composite wear pad using a weldable substrate, a hard particle polymeric flexible sheet and a matrix alloy polymeric sheet.

FIG. 5 is a schematic view of a specific embodiment of an arrangement to produce a composite wear pad wherein the arrangement is generally designated as 114. The specific arrangement 114 comprises a substrate 116 that has a top surface 118, a bottom surface 120 and edge surfaces 122. A flexible hard particle sheet 124, which has a top surface 126, is positioned on the top surface 118 of the substrate 116. The flexible hard particle sheet 124 contains hard particles 132 entwined in a flexible cloth matrix 134. As one alternative, the flexible cloth matrix is an organic binder in a cloth-like form. The organic binder can be comprised of one or more polymeric materials. Suitable polymeric materials for use in the sheets can include one or more fluoropolymers including, but not limited to, polytetrafluoroethylene (PTFE).

A flexible matrix alloy sheet 128, which has a bottom surface 130, has the bottom surface 130 against the top surface 126 of the flexible hard particle sheet 124. Like for the flexible hard particle sheet 124, the flexible matrix alloy sheet 128 comprises a flexible sheet matrix that is an organic binder as described above. Upon the application of heat and/or pressure in a consolidation step, the matrix alloy material in the flexible matrix alloy sheet 128 melts and infiltrates through the hard particles in the flexible hard particle sheet 124 and bonded metallurgically to the substrate surface 118. The resultant article is a composite wear pad. Details about the consolidation step are set forth hereinafter.

Referring to the manufacture of the flexible sheets, the desired powder metal, powder alloy, and/or powder matrix material composition of the hard particle layer is selected and combined with an organic material, such as a polymeric powder, for the formation of the sheet. Any metal, alloy, and/or hard particle composition recited herein for the hard particle layer can be combined or blended with an organic material for the formation of the sheet. The organic material and the powder metal, powder alloy, and/or powder hard particle composition are mechanically worked or processed to trap the metal, alloy, and/or hard particle powder in the organic material. In one embodiment, for example, the desired powder composition is mixed with 3-10% PTFE in volume (e.g., 94 volume percent crushed cemented carbide particles, tungsten carbide particles or titanium carbide particles or combinations thereof and 6% PTFE in volume), and mechanically worked to fibrillate the PTFE and trap the powder metal or powder alloy. Mechanical working can include rolling, ball milling, stretching, elongating, spreading or combinations thereof. In some embodiments, the resulting sheet comprising the powder metal or powder alloy has a low elastic modulus and high green strength. In some embodiments, a sheet comprising a powder metal, powder alloy, and/or powder hard particle composition of the coating is produced in accordance with the disclosure of one or more of U.S. Pat. Nos. 3,743,556, 3,864,124, 3,916,506, 4,194,040 and 5,352,526, each of which is incorporated herein by reference in its entirety.

Figure 6:
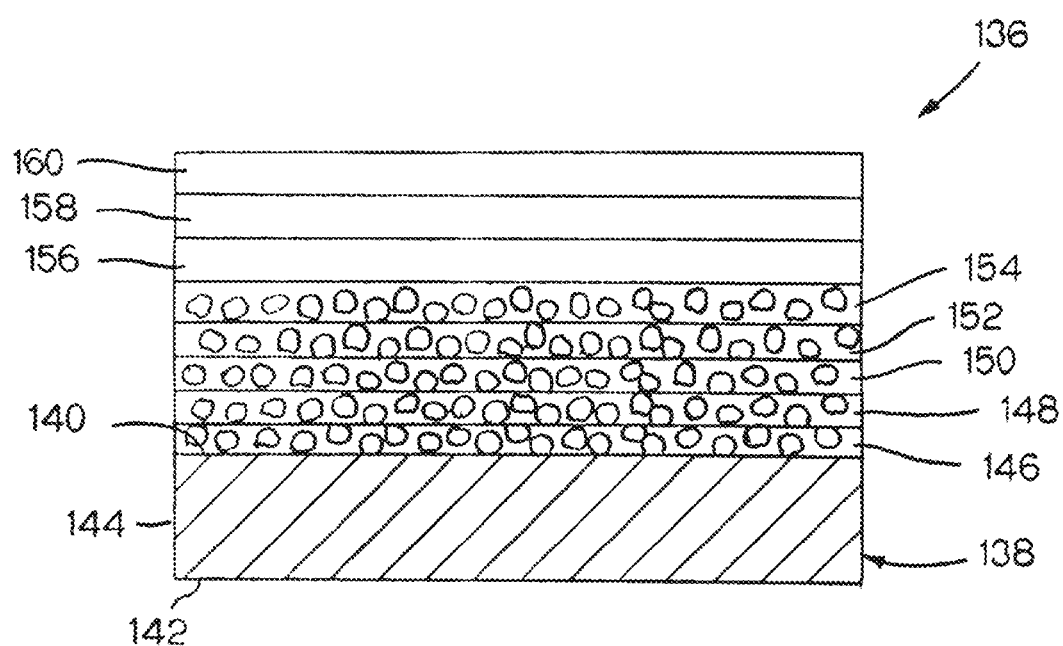
FIG. 6 is a schematic view of an arrangement to produce a composite wear pad using a plurality of hard particle polymeric sheets and a plurality of matrix alloy polymeric sheets, and a substrate.

FIG. 6 is a schematic view of a specific embodiment of an arrangement to produce a composite wear pad wherein the arrangement is generally designated as 136. The specific arrangement 136 includes a substrate 138 that has a top surface 140, a bottom surface 142, and edge surfaces 144. A plurality of flexible hard particle sheets (146, 148, 150, 152, 154) are positioned on the top surface 140 of the substrate 138. A plurality of flexible matrix alloy sheets (156, 158, 160) are positioned on the plurality of flexible hard particle sheets (146, 148, 150, 152, 154). The flexible hard particle sheets and the flexible matrix alloy sheets are essentially the same as the flexible hard particle sheet 124 and flexible matrix alloy sheet 128.

Upon the application of heat and/or pressure in a consolidation step, the matrix alloy material in the flexible matrix alloy sheet (156, 158, 160) melts and infiltrates through the hard particles in the flexible hard particle sheets (146, 148, 150, 152, 154) and metallurgically bonds to the substrate surface 140. The resultant article is a composite wear pad. Details about the consolidation step are set forth hereinafter.

Figure 7:
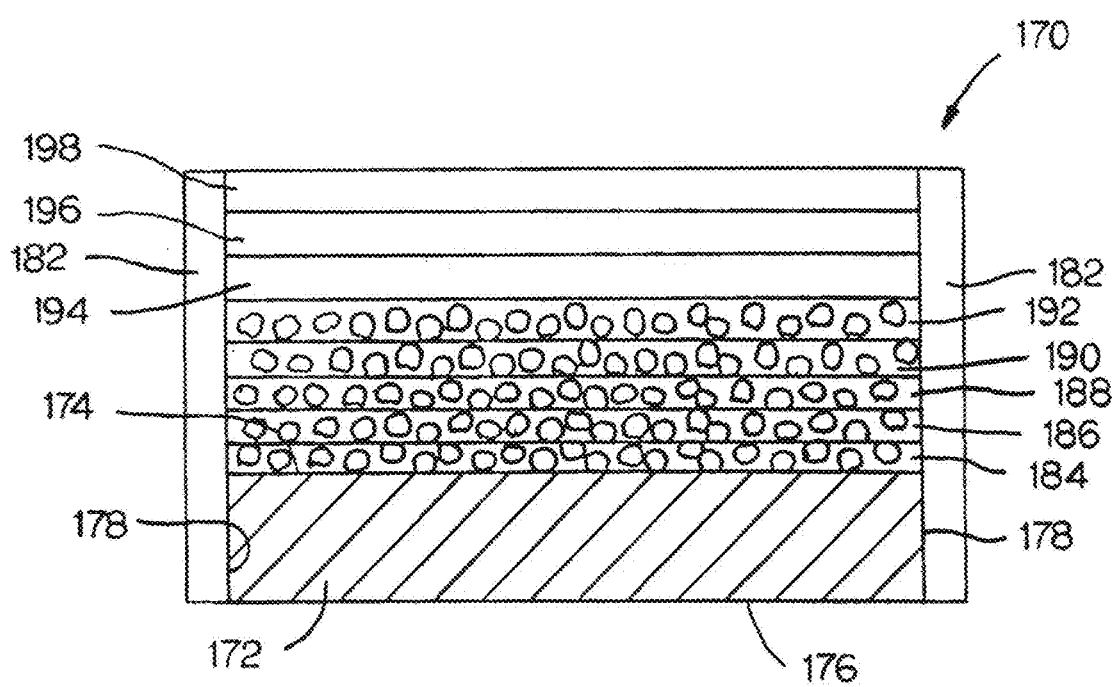
FIG. 7 is a schematic view of an arrangement to produce a composite wear pad using a plurality of hard particle polymeric sheets and a plurality of matrix alloy polymeric sheets, and a substrate wherein the arrangement is surrounded by a ceramic thermal insulating blanket.

FIG. 7 is a specific embodiment of an arrangement to produce a composite wear pad wherein the arrangement is generally designated as 170. The specific arrangement 170 includes a substrate 172 that has a top surface 174, a bottom surface 176, and edge surfaces 178. A plurality of flexible hard particle sheets (184, 186, 188, 190, 192) are positioned on the top surface 174 of the substrate 172. A plurality of flexible matrix alloy sheets (194, 196, 198) are positioned on the plurality of flexible hard particle sheets (184, 186, 188, 190, 192). The arrangement 170 is surrounded by a ceramic thermal insulating blanket 182. Upon the application of heat and/or pressure in the consolidation step, the matrix alloy material in the flexible matrix alloy sheet (194, 196, 198) melts and infiltrates through the hard particles in the flexible hard particle sheets (184, 186, 188, 190, 192). The resultant article is a composite wear pad. Details about the consolidation step are set forth hereinafter.

Figure 8:
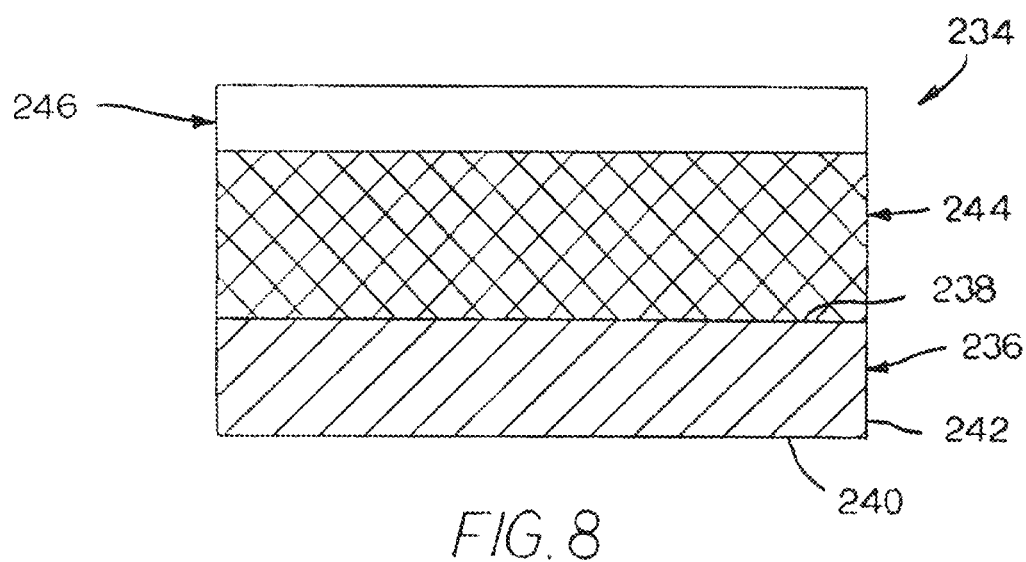
FIG. 8 is a schematic view of an arrangement to produce a composite wear pad using a hard particle preform and a matrix alloy preform and a substrate.

FIG. 8 is a schematic view of an arrangement to produce a composite wear pad generally designated as 234. The arrangement comprises a substrate 236 that has a top surface 238, a bottom surface 240 and edge surfaces 242. A hard particle preform 244 is positioned on the top surface 238 of the substrate 236, and a matrix alloy preform 246 is positioned on the top surface of the hard particle preform 244. The preform comprises a green body that has been consolidated (e.g., pressing) to a particle density. Upon the application of heat and/or pressure in the consolidation step, the matrix alloy material in the matrix alloy preform 246 melts and infiltrates through the hard particles in the hard particle preform to form the composite wear pad. Details about the consolidation step are set forth hereinafter.

Figure 9:
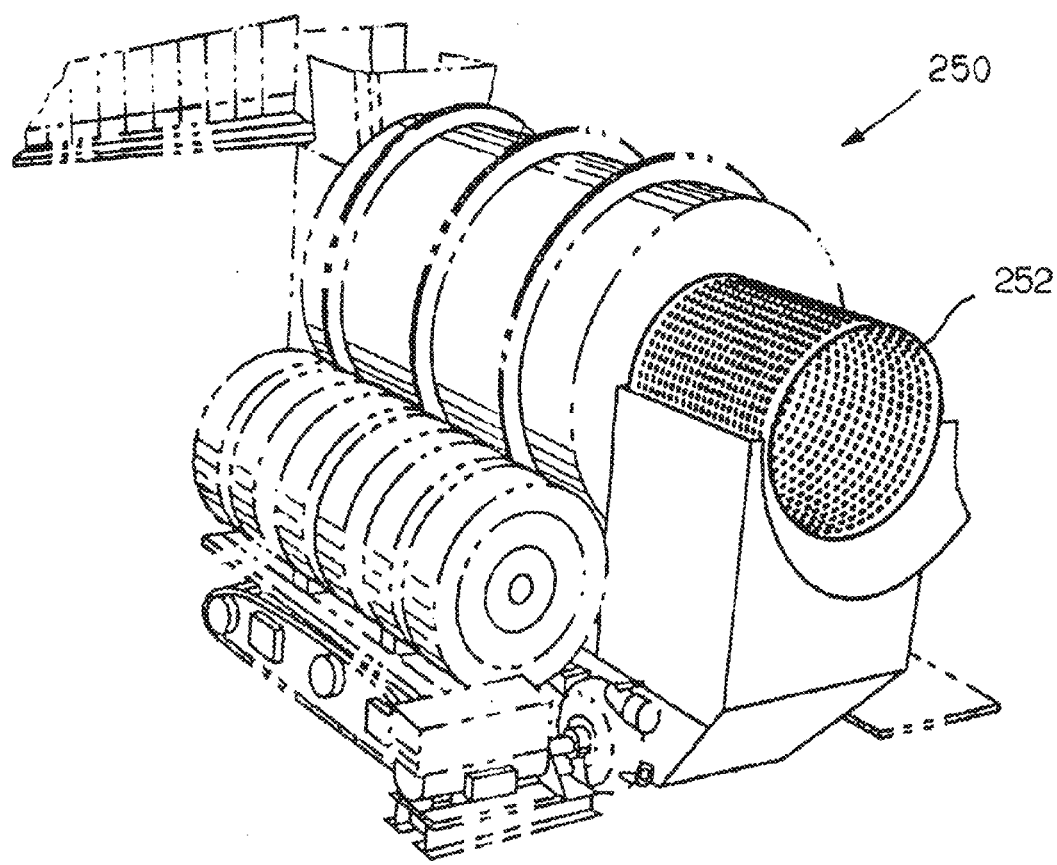
FIG. 9 is a isometric view of a conventional sieve screen used in a relocatable oil sand slurry preparation system.
Figure 10:
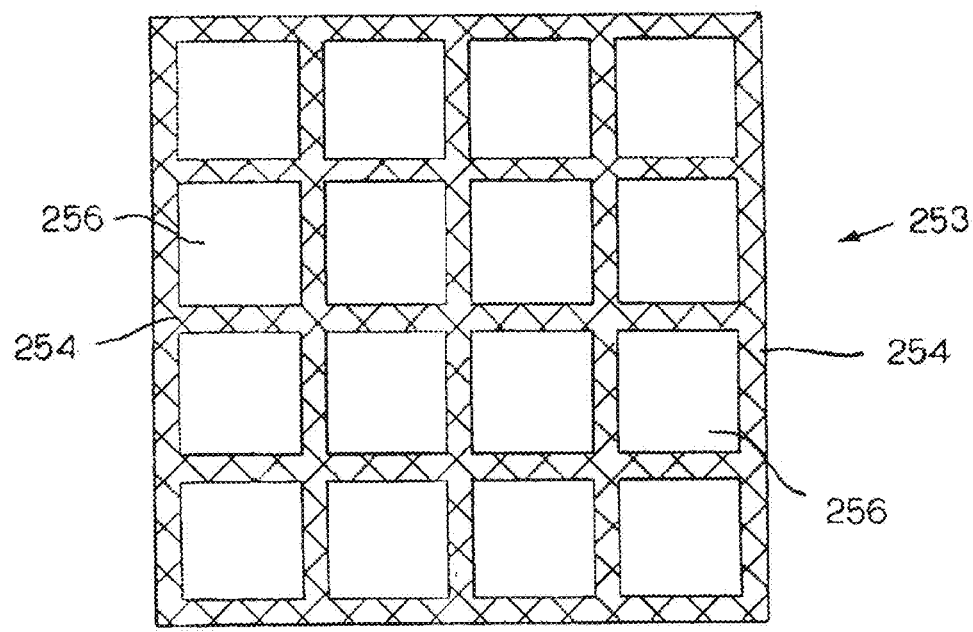
FIG. 10 is a schematic view of a plurality of inventive composite wear pads secured to an oil sands sifting screen.

FIG. 9 is an isometric view of a conventional sieve screen 252 which is a part of a relocatable oil sand slurry preparation system 250 as shown in U.S. Pat. No. 7,984,866 to Cymerman et al. The reference to U.S. Pat. No. 7,984,866 is for the purpose of providing a description of an environment in which a sieve screen operates. An inventive sieve screen 253 is shown in FIG. 10, which is a schematic view of a plurality of wear pads secured to an oil sands sifting screen. In FIG. 10, the inventive sieve screen 253 has a screen portion 254 and a plurality of composite wear pads 256.

Figure 11:
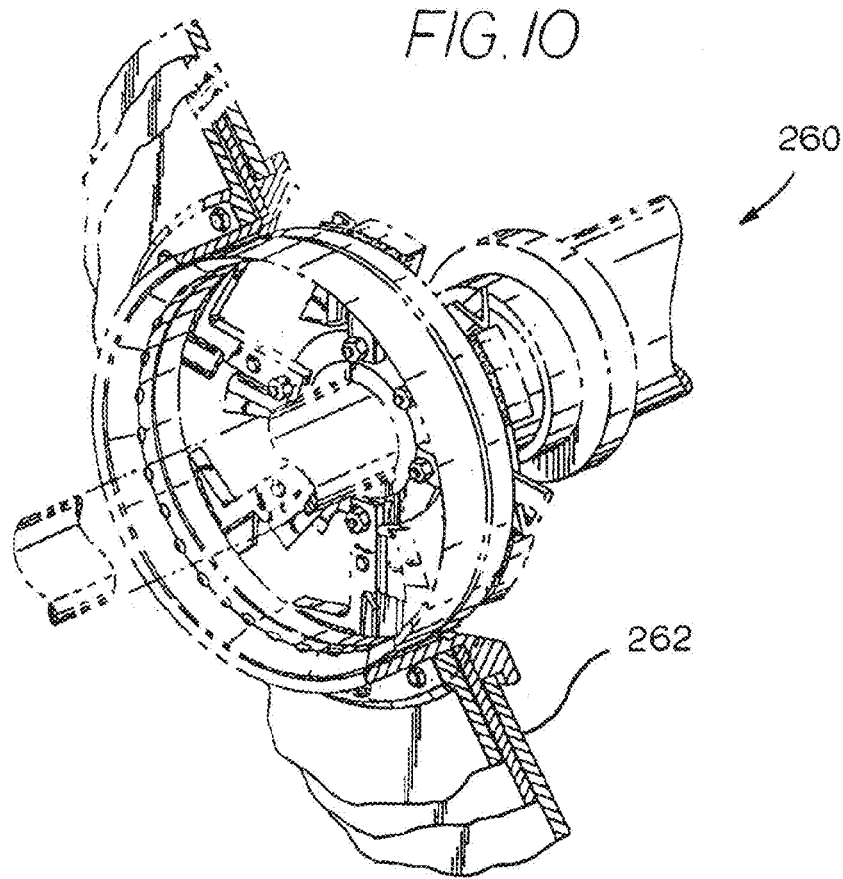
FIG. 11 is an isometric view of a coal pulverizer that includes a conventional cheek plate.
Figure 12:
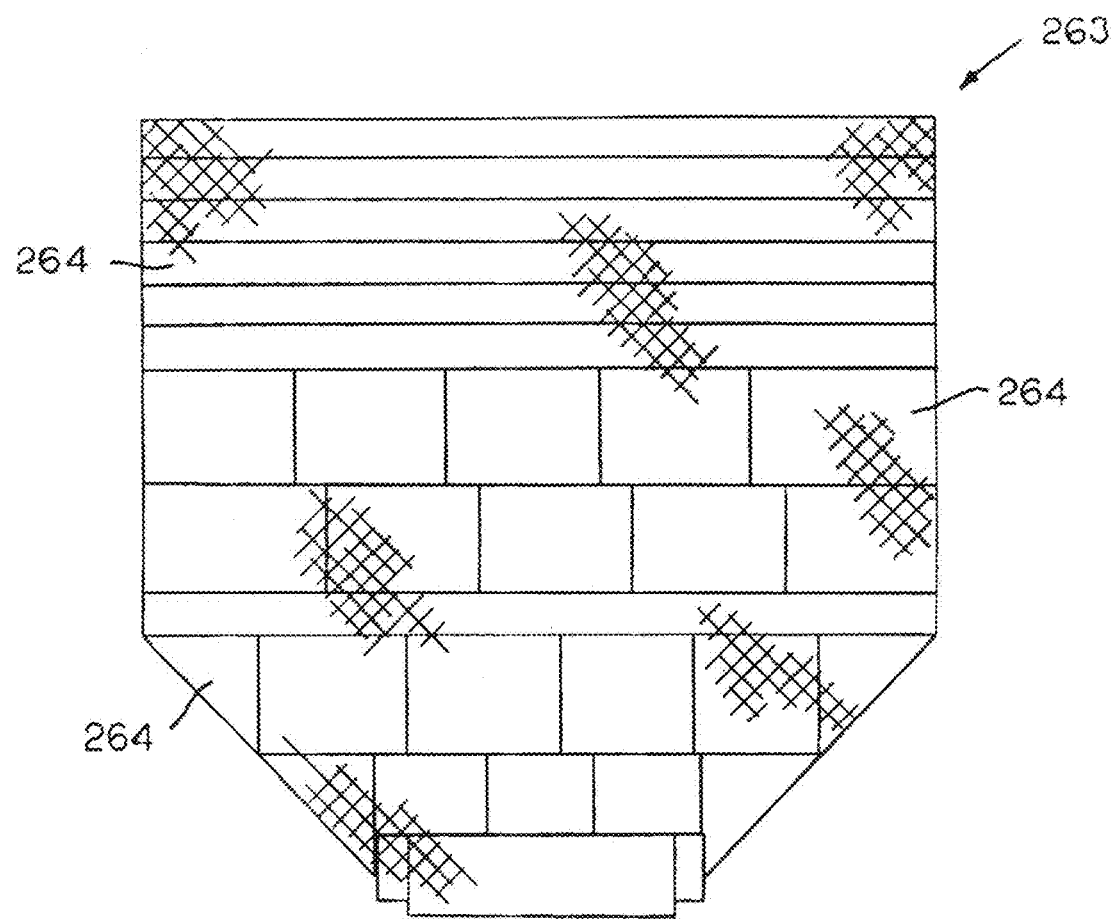
FIG. 12 is a schematic view of an inventive cheek plate comprising a plurality of composite wear pads.

FIG. 11 is an isometric view of a conventional coal pulverizer 260 that includes a conventional cheek plate 262 as shown in United States Patent Application Publication No. US 2005/0103909 to Lin et al. The reference to U.S. Patent Application Publication No. US 2005/0103909 is for the purpose of providing a description of an environment in which a cheek plate operates. FIG. 12 is a schematic view that shows an inventive cheek plate 263 that comprises a plurality of composite wear pads 264 joined together to form the inventive cheek plate 263.

In reference to the processes used to produce the composite wear pad, there are several processes that are suitable. These processes, as well as some alternative or optional features, are described below.

In one basic process, the article (e.g., a composite wear pad) is made by gluing one or more layers of hard particle polymeric flexible sheets onto a substrate. Then on top of the hard particle polymeric flexible sheets, one or more matrix alloy polymeric flexible sheets are glued on the top. The number and thickness of the flexible sheets are such that after consolidation, the thickness of the hard particle-matrix alloy layer or cladding layer of the present invention has a thickness equal to or greater than 3 millimeters (mm). In one range, the thickness of the cladding layer of the invention can have a thickness that ranges between about 3 mm and about 20 mm. Still further in another range, the thickness of the cladding layer of the invention can have a thickness that ranges between about 5 mm and about 15 mm. Yet, further in another range, the thickness of the cladding layer of the invention can have a thickness that ranges between about 10 mm and about 20 mm.

The entire assembly is placed in a vacuum furnace with pressure between 0.1 psi and 2 psi applied to the top of the piece. The piece with the downward pressure is heated under controlled atmosphere, e.g. best vacuum, partial pressure of argon, nitrogen and or hydrogen to let the glue and polymer vaporize, dissociate and leave from the structure, and after sufficient heating, the matrix alloy melts, infiltrates the hard particle layer and bonds metallurgically the hard particle layer to the substrate. The pressure can be applied by putting a weight over the top of the structure or applying beads surrounding and on top of the structure. The furnace, atmosphere and other operational parameters (e.g., temperature, ramping rate and duration) can be dependent upon the matrix alloy being used. As one example, if a nickel-based matrix alloy is being used, the infiltration may be finished by heating under vacuum or a partial pressure (e.g., a pressure of less than 1 atmosphere).

In some embodiments, the substrate is cleaned prior to application of the sheet or liquid carrier comprising the powder metal or powder alloy composition. Cleaning the substrate can be administered by chemical treatment, mechanical treatment or both. In some embodiments, for example, a substrate is cleaned with sodium hydroxide solution and/or subjected to grit or particle blasting.

One variation of the first basic process comprises instead of stacking several layers of polymeric flexible sheets to achieve a thickness of the hard particle-matrix alloy layer equal to between about 3 mm and about 20 mm, a single thick polymeric flexible sheet that has a thickness to achieve a thickness of the hard particle-matrix alloy layer equal to between about 3 mm and about 20 mm thick is glued to the substrate. Still further in another range, the thickness of the cladding layer of the invention can have a thickness that ranges between about 5 mm and about 15 mm. Yet, further in another range, the thickness of the cladding layer of the invention can have a thickness that ranges between about 10 mm and about 20 mm.

Another variation of the first basic process is that instead of a polymeric flexible sheet, a hard particle and/or matrix alloy preforms are made by cold isostatic pressing or similar method of by pre-sintering is placed on the substrate. The preforms are of a thickness such that the hard particle-matrix alloy layer achieves a thickness between 3 mm and 20 mm thick is placed onto the substrate. Still further in another range, the thickness of the cladding layer of the invention can have a thickness that ranges between about 5 mm and about 15 mm. Yet, further in another range, the thickness of the cladding layer of the invention can have a thickness that ranges between about 10 mm and about 20 mm.

In another variation of the processes, a mold is fitted over the substrate to be cladded. In the mold the hard particles are poured into the mold and tapped or vibrated until sufficiently packed. The hard particle layer, which has a thickness so that the hard particle-matrix alloy layer achieves a thickness between about 3 mm to about 20 mm, is on the substrate. Then matrix alloy powder is placed on top of the hard particle layer. The entire assembly is placed in a vacuum furnace with downward pressure between 0.1 psi and 2 psi is applied to the top of the piece. The piece with the downward pressure is heated until the matrix alloy infiltrates the hard particle layer and metallurgically bonds with the substrate. The mold is removed mechanically or chemically from final piece. The mold can be sacrificial or reusable. As an alternative, instead of using loose powder, a liquid can be used to enhance the packing in the mold until the appropriate thickness is obtained whereby the hard particle-matrix alloy layer achieves a thickness between 3 mm and 20 mm. After drying, matrix alloy, either in powder, polymeric sheet, or chunks, chips or alloy sheet can be applied over the hard particle layer. Alternatively, the desired powder metal or powder alloy composition is combined with a liquid carrier for application to the substrate.

In some embodiments, for example, the powder metal or powder alloy is disposed in a liquid carrier to provide slurry or paint for application to the substrate. Suitable liquid carriers for powder metal or powder alloy compositions described herein comprise several components including dispersion agents, thickening agents, adhesion agents, surface tension reduction agents and/or foam reduction agents. In some embodiments, suitable liquid carriers are aqueous based. Powder metal or powder alloy compositions disposed in a liquid carrier can be applied to surfaces of the substrate by several techniques including, but not limited to, spraying, brushing, flow coating, dipping and/or related techniques as long as final thickness is achieved. The powder metal or powder alloy composition can be applied to the substrate surface in a single application or multiple applications depending on desired thickness of the coating. Moreover, in some embodiments, powder metal or powder alloy compositions disposed in liquid carriers can be prepared and applied to substrate surfaces in accordance with the disclosure of U.S. Pat. No. 6,649,682 which is hereby incorporated by reference in its entirety.

After being disposed over a surface of the substrate, the sheet or liquid carrier comprising the hard particles or powder matrix alloy is heated to provide the hard particle-matrix alloy layer comprising the hard particles and the matrix alloy metallurgically bonded to the substrate. The sheet or liquid carrier is decomposed or burned off during the heating process. The hard particle-matrix alloy layer resulting from the heating process can have any property or combination of properties based upon the hard particles and matrix alloy. In some embodiments, the substrate and sheet or liquid carrier comprising the powder hard particles or powder matrix alloy composition is heated in a vacuum, inert or reducing atmosphere at a temperature and for a time period where the integrity of the substrate is maintained and the powder hard particles or powder matrix alloy is densified to the desired amount. As known to one of skill in the art, heating conditions including temperatures, atmosphere and time are dependent on several considerations including the identity of the substrate, the identity of the powder hard particles or powder matrix alloy and the desired structure of the resulting hard particle-matrix alloy layer.

The preferred consolidation method is still infiltration by vacuum furnace, but infiltration in an open air furnace/kiln as well as induction, plasma, and laser heating is possible dependent on the identity of matrix alloy, hard particles and substrate.

In any of the above processes, the substrate may be patterned or pre-coated or treated for enhancing the bonding between the hard particle-matrix alloy layer and the substrate.

In regard to general conditions of the processing, processing peak temperature: at least above the liquidus temperature of the matrix alloy, and typically 50° C. to 120° C. above the liquidus of the matrix alloy, allowing a sufficiently low viscosity to allow the matrix alloy to infiltrate the hard particle layer, dependent upon the matrix alloy used. Unlike earlier methods in which the heating steps up to infiltration can be done quickly (e.g., about 7° C. per minute or higher) without many harmful defects to the thinner coating, the thicker cladded piece must be infiltrated slowly and with greater control to ensure that the matrix alloy does not melt too fast and flow over the hard particles or wash away particles off the piece. Instead, the present process must be slow (e.g., a heating rate between about 1° C. per minute and about 6° C. per minute and under greater control to ensure the matrix alloy flows into and between the hard particles. Alternative ranges for the heating rate comprise a heating rate between about 1° C. per minute and about 3° C. per minute, and a heating rate between about 3° C. per minute and about 5° C. per minute. Debindering temperature is dependent on the binders, mostly from 400-700 degrees C. Earlier methods can also be performed so that the binder can be burned off relatively quickly during the furnace cycle. This is not suitable for forming thicker cladded pieces because the debindering for thicker cladded pieces must be done with great control to prevent escaping decomposition products from building up in the cladded layer causing holes, voids, and other deleterious defects. In reference to using a weight, in some embodiments of the invention, weight may be placed over the assembly. In some applications, too little or no weight over the coating prior to debindering and subsequent infiltration can result in cracking and voids, but too much weight can crush the powder layers after debindering and before infiltration. The ideal range is from about 0.1 PSI to about 2 PSI with a preferred range between about 0.2 PSI and about 1.0 PSI.

Figure 15:
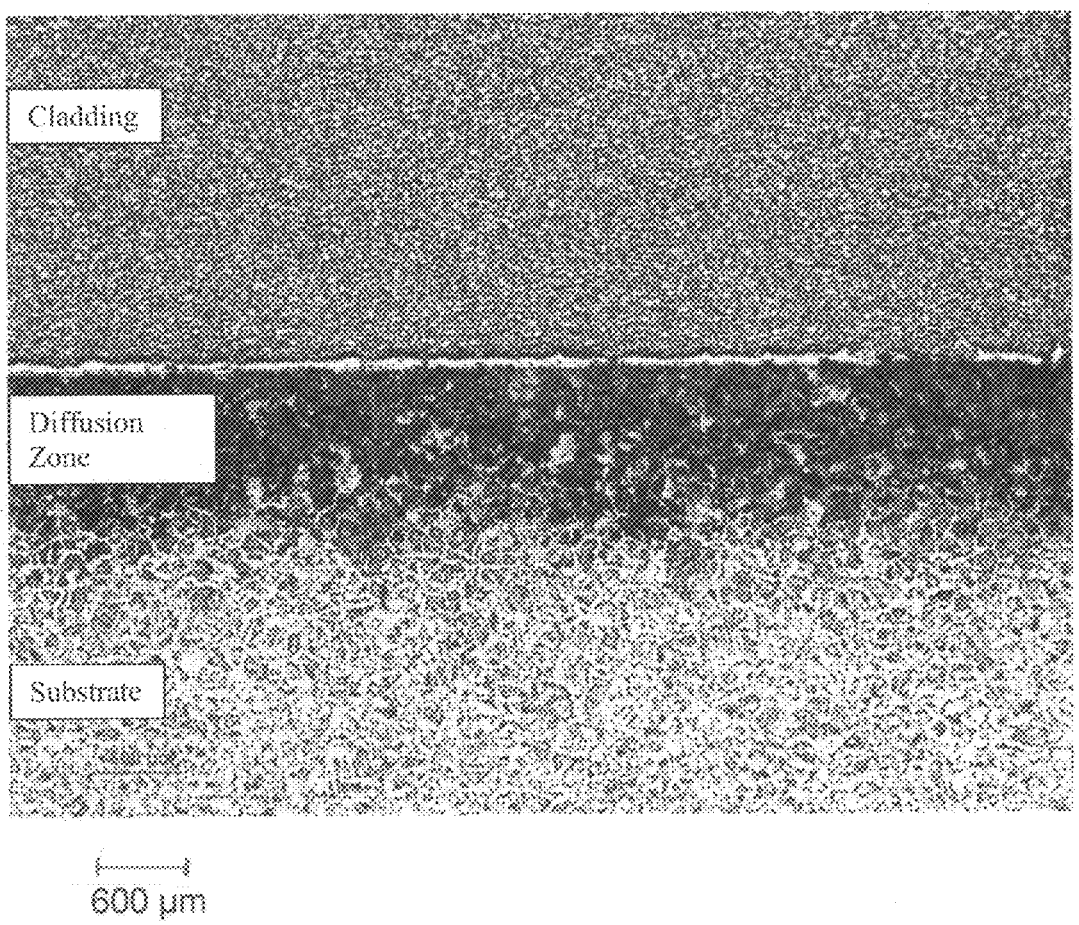
FIG. 15 is a photomicrograph, which has a scale of 600 μm, showing the microstructure of a composite wear pad.

The wear pad, of which the photomicrograph pictured in FIG. 15 was taken, was made by first preparing the substrate, which was 4140 steel, by washing it with a sodium hydroxide solution, and, after drying, was grit blasted. Then five layers of 2.5 mm thick polymeric flexible sheets with cemented tungsten carbide were affixed to the substrate with glue. Then four layers of 2.5 mm thick polymeric flexible sheets with a nickel based alloy of Ni-(13-17)Cr-(3-4.5)B, which is 45% to 60% of the mass of polymeric flexible sheets with cemented tungsten carbide, were applied on top of the polymeric flexible sheets with cemented tungsten carbide. The entire piece comprising the substrate with its surface prepared by washing and grit blasting, five layers of 2.5 mm thick polymeric flexible sheets with cemented tungsten carbide, and four layers of 2.5 mm thick polymeric flexible sheets with the above described nickel based alloy was placed in a vacuum furnace and had weight (or load) equal to 0.3 psi placed on top of the entire piece. The piece was heated under vacuum to a sufficient temperature (between about 400° C. and about 700° C.) to remove the organic binder, and then to a temperature equal to between about 1100° C. and about 1150° C. to melt the above-mentioned nickel-based alloy and infiltrate the above-mentioned nickel-based alloy through the tungsten carbide layer. The heating was performed at a rate between about 1° C. per minute and about 6° C. per minute. After solidification and cooling, a composite wear pad shown in FIG. 15 was formed. The thickness of the hard particle-matrix alloy layer was about 12.5 mm. The hard particle-matrix alloy layer showed an abrasion resistance of 0.006 cm³ in accordance with Procedure A of ASTM G65 Standard Test Method for Measuring Abrasion Using the Dry Sand/Rubber Wheel, and an erosion resistance of 0.026 mm³/g at 90 degrees according to ASTM G76-07—Standard Test Method for Conducting Erosion Tests by Solid Particle Impingement Using Gas Jets.

Sometimes, in a batch type processing, it is difficult to control the heating rate of several different parts at the same time. To account for this, some pieces, which are processed in a batch, will be wrapped in several layers of ceramic insulation, or packed in sand to slow down the overall heating of the part to avoid the deleterious effects mentioned above.

In another example of the invention and referring to FIGS. 16, 16A and 16B, which show a cladded article generally designated as 508. The cladded article 508 comprises a molybdenum-nickel-chromium steel plate 500 with an inscribed square 502 in the center of the plate 500 was coated with a 10 mm thick cladding 504. The cladding 504 was made by first preparing the substrate as mentioned above. Then polymeric flexible sheets containing cemented tungsten carbide was placed on top and also conformed down over the corner to provide protection to the internal side of the piece. See FIG. 16B wherein a portion 506 of the cladding has been conformed over the corner of the plate 500. After the cemented tungsten carbide sheets were applied, a flexible polymeric sheet comprising of a nickel based alloy selected from the above tables was applied on top of the cemented tungsten carbide polymeric flexible sheets. The entire piece was wrapped in ceramic blanket, placed into a steel tray, and finally packed with sand to provide an additional thermal barrier to slow the heating. The part was heated at a rate of between about 1° C. per minute to about 6° C. per minute until 50° C. above the liquidus of the nickel based alloy, until the molten alloy sufficiently infiltrated the cemented tungsten carbide. Then the part was cooled. The result was a steel plate with an inscribed square with internal edge protection on one side. Because of the slowed heating, the cladded layer had not pits or voids and was sufficiently dense. The wear properties were similar to the previous example.

Figure 13:
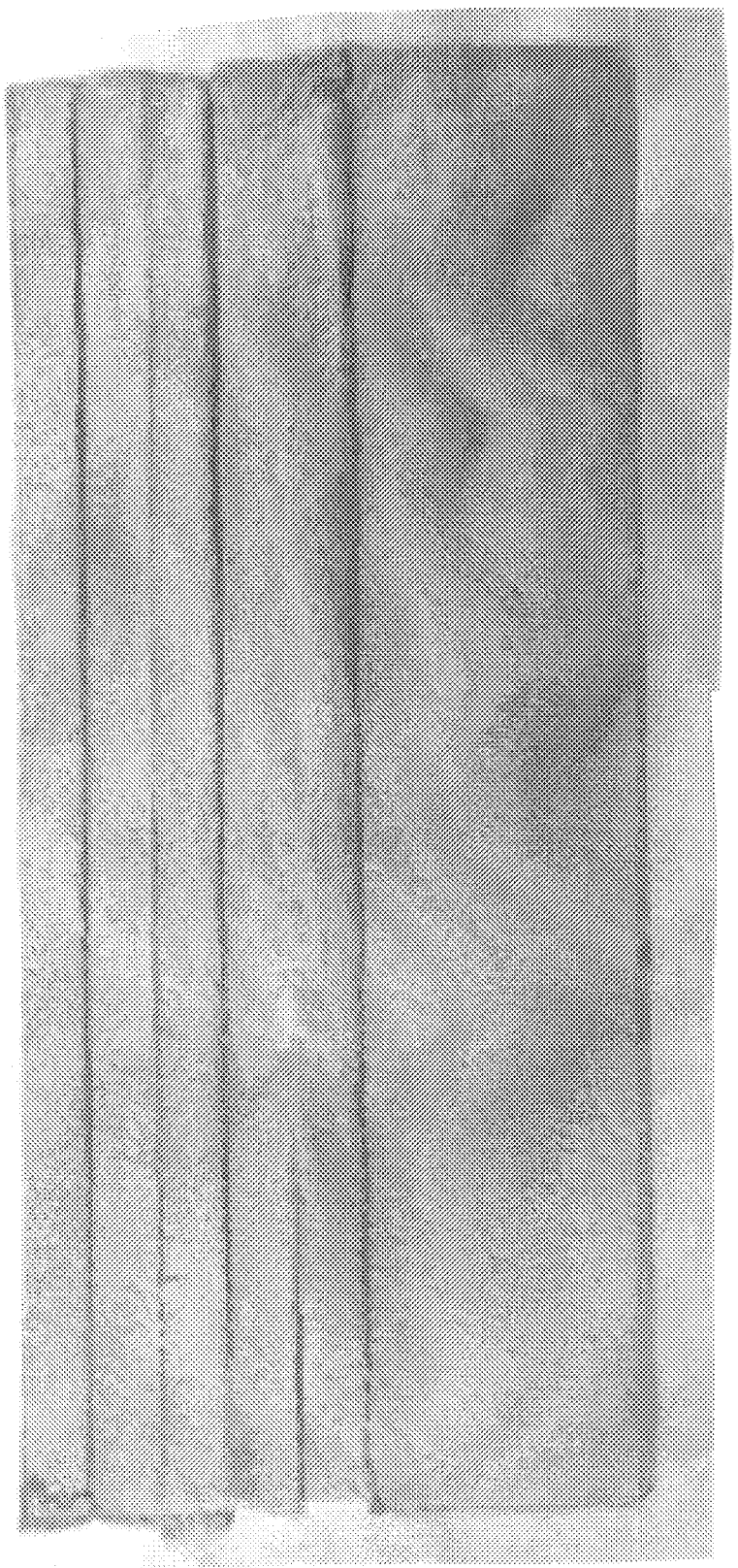
FIG. 13 is a photograph showing a successfully consolidated article used as composite wear pad.
Figure 14:
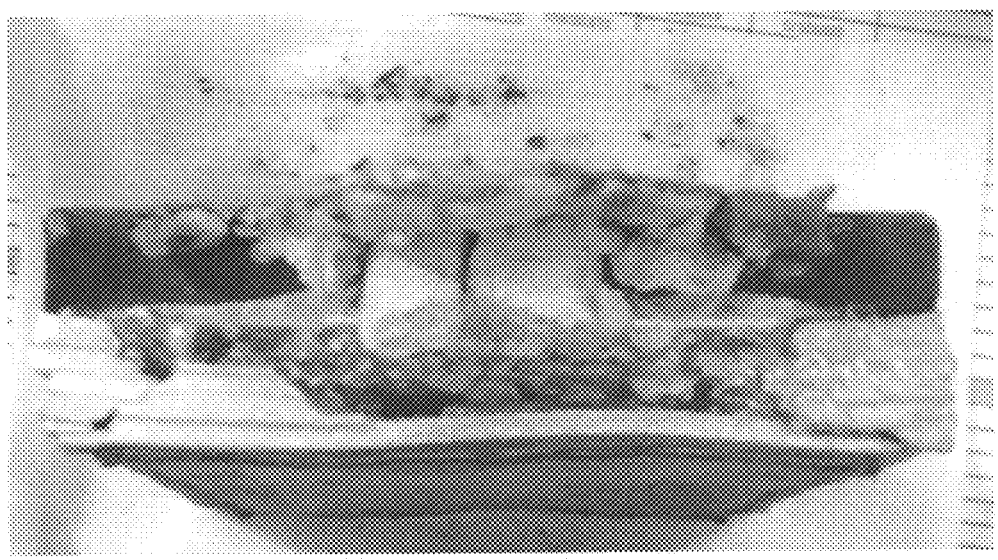
FIG. 14 is a photograph showing an unsuccessfully consolidated article using a composite wear pad wherein the article was crushed during consolidation.

FIG. 13 is a photograph showing a successfully consolidated article using a composite wear pad. FIG. 14 is a photograph showing an unsuccessfully consolidated article using a composite wear pad wherein the article was crushed during consolidation. There is a dramatic difference between the successfully consolidated composite wear pad of FIG. 13 and the unsuccessfully consolidated composite wear pad of FIG. 14. This difference was due to the use of packaging or wrapping (which could be considered to be an enclosure) around the arrangement to produce the composite wear pad prior to consolidation. Exemplary packaging or wrappings include without limitation a ceramic sheet or ceramic blanket, Kaowool, graphite foil coated with ceramic particles like alumina, H—BN or zirconium oxide or flexible material sheet coated with ceramic particles like alumina, H—BN or zirconium oxide to prevent the hard particles from being crushed during the consolidation process. Further, the correct amount of weight to apply during the consolidation step is important in that too much weight will result in crushing the hard particles while too little weight will result in the cladding having voids, cracks and debonding. Further, the correct heating parameters were used during the processing of FIG. 13, heating too fast can cause voids during the debindering of the flexible polymeric sheets; also heating too fast can cause the matrix alloy to run off the part rather than infiltrating the hard particles.

In reference to the microstructure of the composite wear pad, the microstructure of the cross section of a typical wear pad near the interface between the hard particle layer and the substrate is given in FIG. 15. FIG. 15 cross section of a typical wear pad near the interface between the hard particle layer and the substrate, the sample was etched and the photograph uses polarized light to show detail. The hard particles uniformly dispersed in the matrix alloy. The diffusion zone indicates the metallurgical bond between the substrate and the cladding area. The small (less than about 0.5 mm thick) diffusion zone which allows the substrate to retain its properties such as strength, weldabilty, ductility, and toughness after cladding.

The wear pad contains a hard particle layer with hard particles dispersed in a metal or alloy matrix, a braze layer of the matrix alloy/metal identity without or with little hard particles, a diffusion zone in the substrate, and a substrate. The hard particle layer is essentially metallurgically bonded to the substrate. The braze layer of matrix alloy/metal identity may vary from several microns to several hundreds of microns dependent on the composition of hard particle layer, substrate and process parameters. Similarly is the diffusion zone, which can be several microns to several thousand microns thick dependent on the composition of hard particle layer, substrate and process parameters.

While there are many potential applications, one additional application includes a fine gravel crushing anvil. The anvil has a large area of allowable wear before the part is considered scrap. By placing a thick, abrasion and erosion resistant coating onto an anvil the usable life of the anvil is increased. Another application includes lining of a cheek plate for a HPGR crusher. The cheek plate of the crusher sees severe wear, by placing a wear resistant layer of sufficient thickness the usable life of the cheek plate can be extended. In another application, a sieve screen used to sieve out large rocks and other abrasive materials can have its usable life extended by placing a wear resistant layer of sufficient thickness.

The patents and other documents identified herein are hereby incorporated by reference herein. Other embodiments of the invention will be apparent to those skilled in the art from a consideration of the specification or a practice of the invention disclosed herein. It is intended that the specification and samples are illustrative only and are not intended to be limiting on the scope of the invention. The true scope and spirit of the invention is indicated by the following claims.

What is claimed is:

1. A composite wear pad comprising:
a substrate being selected from the group consisting of iron based alloys, steel, nickel based alloys, and cobalt based alloys, the substrate comprising a surface for engaging an article;
a hard particle-matrix alloy layer bonded metallurgically to the substrate, the hard particle-matrix alloy layer comprising a plurality of hard particles dispersed uniformly in a nickel-based matrix alloy; and
the hard particle-matrix alloy layer of the composite wear pad having a thickness ranging between greater than about 13 millimeters and about 20 millimeters, wherein the hard particle-matrix alloy layer is void-free.

2. The composite wear pad according to claim 1 wherein the hard particles comprise one or more of the following hard particles: metal carbides, metal nitrides, metal carbonitrides, metal borides, metal silicides, cemented carbides, cast carbides, ceramics or mixtures thereof.

3. The composite wear pad according to claim 1 wherein the hard particles are selected from the following hard particles: tungsten carbide, cemented tungsten carbide, cast carbide, spherical cast carbide, crushed binderless carbide, crushed cemented tungsten carbide, cermet, and/or all mixtures thereof.

4. The composite wear pad according to claim 1 wherein the hard particle-matrix alloy layer comprises the hard particles in an amount between about 30 volume percent and about 80 volume percent of the hard particle-matrix alloy layer, and the matrix alloy is present in an amount between about 20 volume percent and about 70 volume percent of the hard particle-matrix alloy layer.

5. The composite wear pad according to claim 1 further comprising a diffusion zone between the hard particle-matrix alloy layer and the substrate, the diffusion zone having a thickness ranging between 1 micrometers and 2000 micrometers.

6. The composite wear pad according to claim 1 having an arcuate convex shape.

7. The composite wear pad according to claim 1 wherein the substrate comprises drilled or tapped holes, chamfers, channels, post or threaded posts.

8. The composite wear pad according to claim 1, wherein the article comprises a base plate.

9. The composite wear pad of claim 1, wherein the article is an inner diameter of a tube.

10. The composite wear pad of claim 1, wherein the article is an oil sands sifting screen.

11. The composite wear pad of claim 1, wherein the article is a cheek plate.

12. The composite wear pad of claim 1, wherein the hard particle-matrix alloy layer exhibits an adjusted volume loss less than 0.02 $cm^3$ according to ASTM G65 Standard Method for Measuring Abrasion Using the Dry Sand/Rubber Wheel, Procedure A.

13. The composite wear pad of claim 1, wherein the hard particle-matrix alloy layer exhibits an adjusted volume loss less than 0.008 $cm^3$ according to ASTM G65 Standard Method for Measuring Abrasion Using the Dry Sand/Rubber Wheel, Procedure A.

14. The composite wear pad of claim 1, wherein the hard particle-matrix alloy layer exhibits an erosion rate of less than 0.05 $mm^3/g$ at a particle impingement angle of 90 degrees according to ASTM G76-07 Standard Test Method for Conducting Erosion Tests by Solid Particle Impingement Using Gas Jets.

15. The composite wear pad of claim 1, wherein the matrix alloy is nickel based alloy of composition 13-17 weight percent chromium, 3-4.5 weight percent boron, 0-1 weight percent carbon and the balance nickel.

16. The composite wear pad of claim 1, wherein the matrix alloy is nickel based alloy of composition 12-16 weight percent chromium, 8-12 weight percent phosphorus, 0-1 weight percent carbon and the balance nickel.

17. The composite wear pad of claim 1, wherein the matrix alloy is nickel based alloy of composition 23-27 weight percent chromium, 8-12 weight percent phosphorus, 0-1 weight percent carbon and the balance nickel.

18. The composite wear pad of claim 1, wherein the matrix alloy is nickel based alloy of composition 17-21 weight percent chromium, 9-11 weight percent silicon, 0-1 weight percent carbon and the balance nickel.

19. The composite wear pad of claim 1, wherein the matrix alloy is nickel based alloy of composition 20-24 weight percent chromium, 5-8 weight percent silicon, 3-6 weight percent phosphorus and the balance nickel.

20. The composite wear pad of claim 1, wherein the matrix alloy is nickel based alloy of composition 15-19 weight percent chromium, 7-11 weight percent a combination of silicon and boron and the balance nickel.

* * * * *